United States Patent

Artis et al.

[11] Patent Number: 5,923,284
[45] Date of Patent: Jul. 13, 1999

[54] RADAR FOR THE DETECTION OF OBSTACLES, ESPECIALLY FOR AUTOMOBILE VEHICLES

[75] Inventors: Jean-Paul Artis, Plouzane; Pascal Cornic, St Renan, both of France

[73] Assignee: Thomson-CSF, Paris, France

[21] Appl. No.: 08/994,567

[22] Filed: Dec. 19, 1997

[30] Foreign Application Priority Data

Dec. 20, 1996 [FR] France ................................ 96 15740

[51] Int. Cl.[6] .......................... G01S 13/08; G01S 13/93
[52] U.S. Cl. ......................... 342/129; 342/70; 342/127
[58] Field of Search .......................... 342/127, 129, 342/194, 70

[56] References Cited

U.S. PATENT DOCUMENTS

| | | | |
|---|---|---|---|
| 4,851,851 | 7/1989 | Hane | 342/127 |
| 5,285,207 | 2/1994 | Asbury et al. | |
| 5,420,591 | 5/1995 | Annee et al. | |
| 5,424,747 | 6/1995 | Chazelas et al. | 342/70 |
| 5,504,490 | 4/1996 | Brendle et al. | |
| 5,598,163 | 1/1997 | Cornic et al. | |

FOREIGN PATENT DOCUMENTS

| | | | |
|---|---|---|---|
| 590206 | 1/1960 | Canada | 342/129 |
| 2 249 448 | 5/1992 | United Kingdom. | |
| WO 95/04943 | 2/1995 | WIPO. | |

*Primary Examiner*—Ian J. Lobo
*Attorney, Agent, or Firm*—Oblon, Spivak, McClelland, Maier & Neustadt, P.C.

[57] ABSTRACT

Disclosed is a radar for the detection of obstacles. The radar uses at least four frequencies referenced $F_1$, $F_2$, $F_3$, $F_4$ such that:

$$F_1 - F_3 = F_2 - F_4$$

and such that:

$(F_1 + F_3) - (F_2 + F_4) =$ Cte where Cte represents a constant frequency value, the measurement of distance from the target being done on the basis of the difference in phase between two signals of which the first $(r_1(t) - r_3(t))$ is constituted by the difference between two received signals corresponding respectively to the frequencies $F_1$ and $F_3$ and the second $(r_2(t) - r_4(t))$ is constituted by the difference between two received signals corresponding respectively to the frequencies $F_2$ and $F_4$. Application in particular to automobile speed control.

15 Claims, 3 Drawing Sheets

RADAR FOR THE DETECTION OF OBSTACLES, ESPECIALLY FOR AUTOMOBILE VEHICLES

BACKGROUND OF THE INVENTION

The present invention relates to a radar for the detection of obstacles. It can be applied especially to automobile vehicles where it can be used to detect obstacles, more particularly obstacles constituted by other preceding vehicles.

Radars designed for large-scale consumer applications must be sold at the lowest possible prices while at the same time complying with the technical performance characteristics needed for reliability or safety. This is especially so with level measurement radars, road traffic management radars and more specifically automobile radars used for speed regulation or obstacle detection. A speed regulation radar for automobiles is designed especially to detect the distance and speed between a carrier vehicle and the vehicle preceding it, in order to enable the carrier vehicle to adjust its speed in relation to that of the preceding vehicle, for example to comply with safety criteria. A radar of this kind must especially be operational whatever the atmospheric conditions.

A known approach to measuring the distance from an obstacle to a radar is to use the phase rotation of the signal sent out by the radar during its to-and-fro path from the radar to the obstacle. The signal sent out e(t) is defined by the following relationship:

$$e(t) = A \cos(2\pi F t) \quad (1)$$

where:
F represents the frequency of the radar signal,
t represents the time;
A represents the amplitude of the radar signal.

The phase rotation $\psi$ or phase shift obtained on this signal after propagation over a distance 2D corresponding to the to-and-fro path between the radar and the obstacle is defined by the following relationship:

$$\psi = 2\pi F \tau \quad (2)$$

where $\tau$ represents the time taken by the radar wave to travel through the to-and-fro distance 2D. Indeed:

$$\tau = \frac{2D}{c} \quad (3)$$

where c represents the velocity of light.
From the relationships (2) and (3), it follows that:

$$D = \frac{c\varphi}{4\pi F} \quad (4)$$

The relationship (4) shows that a simple phase measurement enables access to the measurement of the distance D between the radar and the obstacle. However, in practice, the measurement is ambiguous once the phase shift $\psi$ is greater than $2\pi$, if the receiver has two reception channels in quadrature, or greater than $\pi$ if it includes only one reception channel. This prohibits a direct measurement of distance by means of the phase in a radar use where the frequency is commonly higher than 1 GHz. One approach usually implemented consists then of the use of a differential phase measurement corresponding to radar signals emitted and received on two different frequencies $F_1$ and $F_2$.

A sequence of transmission at a first frequency $F_1$ gives access to a first phase shift $\psi_1$:

$$\varphi_1 = \frac{4\pi D}{c} F_1 \quad (5)$$

Similarly, a sequence of transmission at a second frequency $F_2$ gives access to a second phase shift $\psi_1$:

$$\varphi_2 = \frac{4\pi D}{c} F_2 \quad (6)$$

From the relationships (5) and (6), the measurement of the distance D is deduced:

$$D = \frac{c}{4\pi}\left(\frac{\varphi_2 - \varphi_1}{F_2 - F_1}\right) \quad (7)$$

Assuming:

$$\psi_2 - \psi_1 = \Delta\psi$$

and $$F_1 - F_2 = \Delta F$$

We get:

$$D = \frac{c\Delta\varphi}{4\pi\Delta F} \quad (8)$$

For reasons of cost, the radar devices used in civilian applications and especially in automobile applications often rely on homodyne solutions from the viewpoint of the transmitter and the receiver and on monostatic solutions from the viewpoint of the antenna.

However, this type of device has a major limit related especially to the presence of different noises whose power is far greater than the power of the thermal noise, especially in the lower part of the spectrum of the video signal at output of the mixer. These noises are related to the amplitude noise of the oscillator and of the leakages that result therefrom by mismatching of the circulator-antenna assembly, to the inherent noise of the mixer, to the variations of the apparent standing wave ratio (SWR) of the antenna in the presence of mechanical vibrations and to the presence of rain clutter or again to the splashing of water on the antenna of the radar. In practice, the noises related to the microwave components are greater when the radar works in millimetric wave mode, which is especially the case with automobile radars working at 76 GHz. In practice, the amplitude noise of Gunn type oscillators or of the transistors used for the oscillator function and the noise of the diodes used for the mixer function substantially disturb the estimation of the phase of the received signal and even make this estimation impossible when the frequency of the demodulated reception signal is low.

In the particular case of a radar for the regulation of the speed of automobile vehicles, it is important that the quality of the phase measurement should be preserved when the radial speed of the target detected by the radar is close to zero. Since the detected target is actually the vehicle preceding the carrier vehicle, a radial speed close to zero corresponds to a regulation mode. The Doppler frequency of the radar echo is then close to zero and the estimation of the distance is done on the basis of a particularly noise-infested phase measurement.

The aim of the invention in particular is to overcome this drawback despite the technical limits laid down by the choice of the homodyne radar principle.

SUMMARY OF THE INVENTION

To this end, an object of the invention is a radar for the detection of a target, using at least four frequencies references $F_1$, $F_2$, $F_3$, $F_4$ such that:

$$F_1 - F_3 = F_2 - F_4$$

and such that:

$$(F_1 + F_3) - (F_2 + F_4) = Cte,$$

where Cte represents a constant frequency value, the measurement of distance from the target being done on the basis of the difference in phase between two signals of which the first is constituted by the difference between two received signals corresponding respectively to the frequencies $F_1$ and $F_3$ and the second is constituted by the difference between two received signals corresponding respectively to the frequencies $F_2$ and $F_4$.

The main advantages of the invention are that it can be adapted to several types of radars, and is simple to implement and economical.

BRIEF DESCRIPTION OF THE DRAWINGS

Other features and advantages of the invention shall appear from the following description, made with reference to the appended drawings, of which.

MORE DETAILED DESCRIPTION

Figure 1:
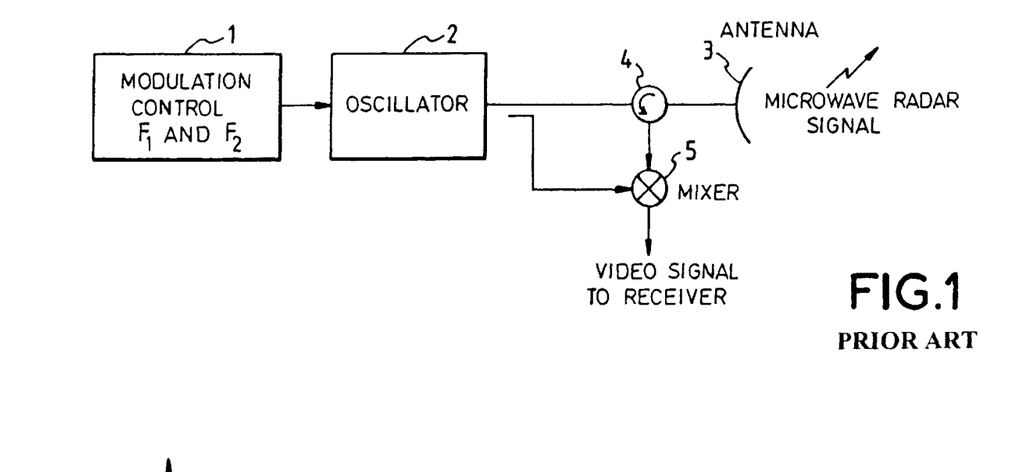
FIG. 1 shows an exemplary embodiment of a prior art radar used in civilian and especially automobile applications.

FIG. 1 uses a block diagram to show an exemplary embodiment of a radar according to the prior art used in civilian applications and especially in automobile applications. In this type of radar, the separation of the targets and the measurement of speeds are done by the filtering of Doppler frequencies and the measurement of distance is obtained by phase measurement after Doppler processing. This type of radar with phase measurement generally relies on homodyne solutions from the viewpoint of the transmitter and receiver, and on monostatic solutions from the viewpoint of the antenna. It comprises for example means 1 to control the modulation of a microwave oscillator 2, working especially at 76 GHz in the field of automobile applications. The control means 1 modulate, for example, the frequency emitted by the oscillator in two frequencies $F_1$, $F_2$. The frequency transmitted by the oscillator 2 is directed towards an antenna 3 through a circulator 4 and amplification means (not shown). The signals received by the antenna 3 are sent to a mixer 5 through the circulator 4 and then demodulated by the signals given by the oscillator 2. These signals are modulated/demodulated sequentially at a first frequency $F_1$ and then at a second frequency $F_2$. The video signal obtained at output of the mixer 5 is sent to the receiver of the radar.

Figure 2:
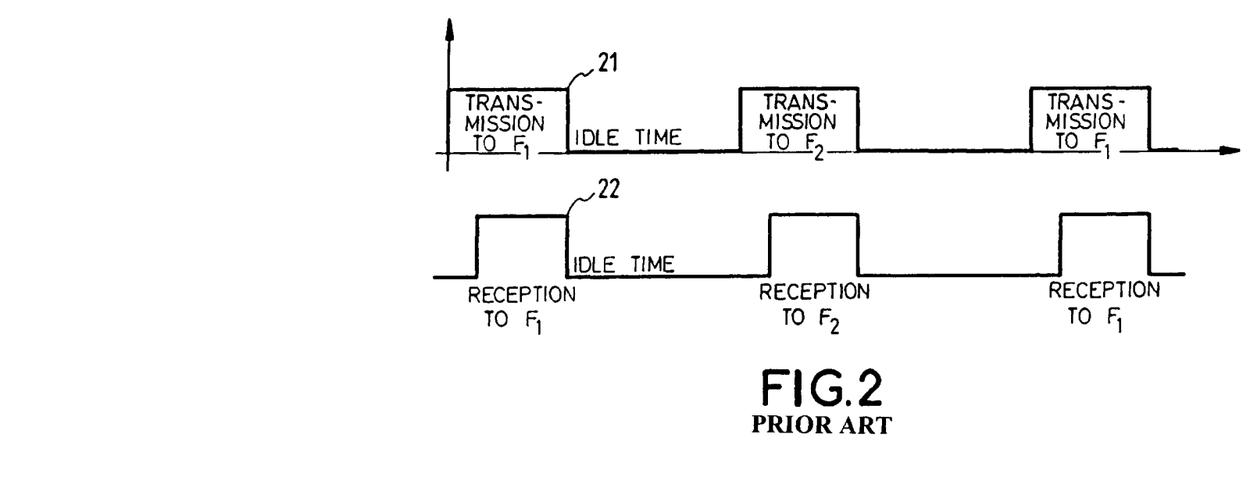
FIG. 2 shows exemplary timing diagrams of the transmission/reception of a bifrequency radar.

FIG. 2 shows an example of a transmission timing diagram 21 and a reception timing diagram 22 of the signals modulated at these two frequencies $F_1$, $F_2$. As is shown by the above relationships (4) to (8), the frequencies are used to remove the ambiguity in distance by a measurement that is not ambiguous between D=0 and $$D = \frac{C}{4\Delta F}.$$

According to FIG. 2, a first transmission is made at the first modulation frequency $F_1$ and is then followed by an idle time or a transmission at a certain frequency not used by the radar. There then begins a second transmission at the second modulation frequency $F_2$ followed by an idle time and then a transmission at the first frequency $F_1$ starts again and so on and so forth sequentially. The reception phases take place at the same time as the transmission phases, and at the same modulation frequencies. As explained further above, a type of radar working according to FIGS. 1 and 2 has a high limit related to the presence of different noises whose power is far greater than the power of the thermal noise, especially in the low part of the spectrum of the video signal at output of the mixer 5. These noises are related to the amplitude noise of the oscillator 2 and to the leakages that result therefrom through the mismatching of the assembly formed by the circulator 4 and the antenna 3. They are also for example due to the inherent noise of the mixer 5, the apparent SWR of the antenna 3 in the presence of mechanical vibrations and the presence of rain clutter or of splashing water on the antenna. In the millimetric wave domain, especially at the 76 GHz frequency for automobile applications, the noises related to the microwave components have a great deal of importance. In particular, the amplitude noise of the Gunn type oscillators or of the transistors used by the oscillator 2, as well as for example the 1/F noise of the Schottky diodes used by the mixer 5 disturb and even prevent the estimation of the phase of the signal received when the frequency of the demodulated reception signal is low. This case actually corresponds to the case where the radial speed of the target detected by the radar is close to zero. In an application of a radar for the regulation of the speed of an automobile vehicle, this corresponds therefore to the regulation mode i.e. the mode where the safety distance between the vehicles is maintained and where the vehicles travel substantially at the same speed.

To enable a measurement of quality of the phase, especially in the case just mentioned, the principle of operation of the radar according to the invention relies on the transmission and reception of sine waves on at least two pairs of frequencies hereinafter referenced $(F_1, F_2)$ and $(F_3, F_4)$.

The first pair consists of a first frequency $F_1$ and a second frequency $F_2$, the second pair consists of a third frequency $F_3$ and a fourth frequency $F_4$. These four frequencies correspond to the following relationships:

$$F_1 - F_3 = F_2 - F_4 = \Delta F \quad \text{(A)}$$

$$\left(\frac{F_1 + F_3}{2}\right) - \left(\frac{F_2 + F_4}{2}\right) = \Delta F' \quad \text{(B)}$$

The choices of the differential frequencies $\Delta F$ and $\Delta F'$ meet certain constraints that are explained hereinafter.

Figure 3:
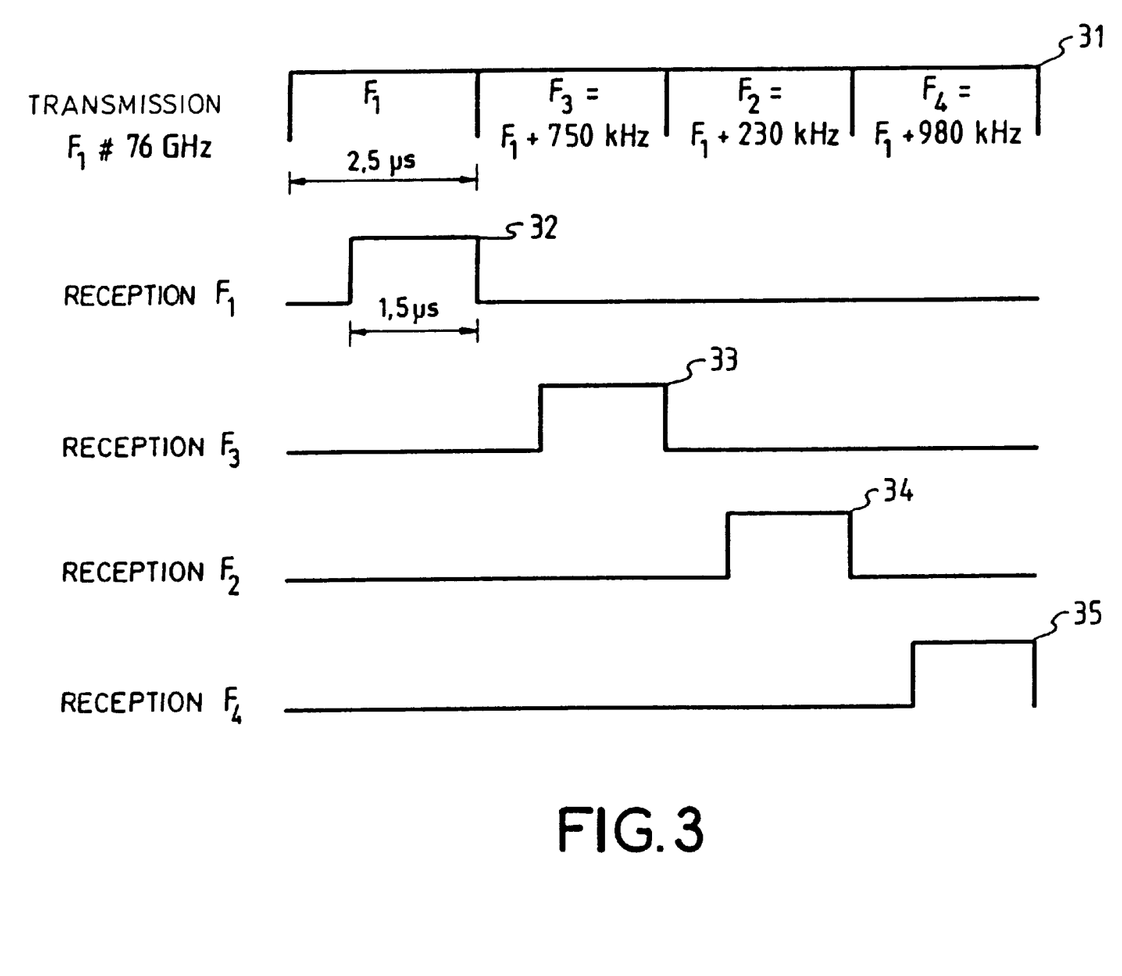
FIG. 3 shows exemplary timing diagrams of transmission/reception of a radar according to the invention.

FIG. 3 shows an exemplary transmission timing diagram 31 and reception timing diagrams 32, 33, 34, 35 at these four frequencies $F_1$, $F_2$, $F_3$, $F_4$ in the particular case of a radar for automobiles adapted to a range of about 150 m.

The transmission frequencies follow one another sequentially for example as indicated here below. Transmission at the first frequency $F_1$ is followed by transmission at the third frequency $F_3$ which is followed by transmission at the second frequency $F_2$ itself followed by transmission at the fourth frequency $F_4$ and then there begins a new transmission at the first frequency $F_1$. The duration of transmission of each phase is for example equal to 2.5 $\mu$s. The values of the frequencies $F_1$, $F_2$, $F_3$, $F_4$ are for example the following:

$F_1$=76 GHz substantially;

$F_2=F_1+\Delta F'$, with $\Delta F'$=230 kHz;

$F_3=F_1+\Delta F$, with $\Delta F$=750 kHz;

$F_4=F_2+\Delta F=F_1+\Delta F+\Delta F'$.

With $F_1$, $\Delta F$ and $\Delta F'$ being fixed, the values of the four frequencies $F_1$, $F_2$, $F_3$, $F_4$ are deduced from the above relationships (A) and (B).

Figure 4:
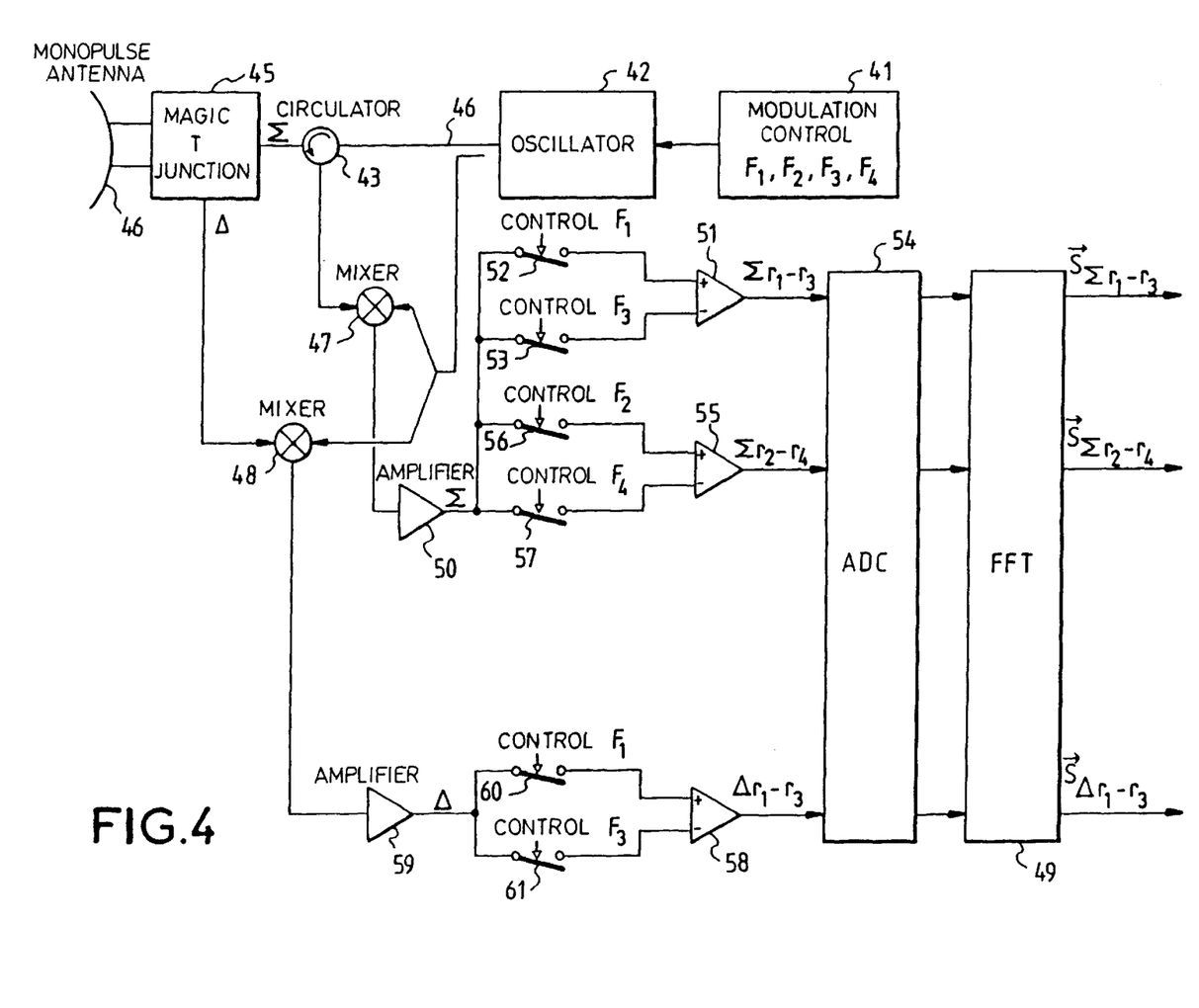
FIG. 4 shows a block diagram of a possible embodiment of a radar according to the invention, associated for example with a monopulse type antenna.

FIG. 4 uses a block diagram to show a possible embodiment of a radar according to the invention.

It comprises for example means 41 to control the modulation of a microwave oscillator 42. The output of this oscillator is connected to the input of a circulator 43 through a coupler 44. The oscillator 42 gives, for example, microwave signals at the frequencies $F_1$, $F_2$, $F_3$, $F_4$ as defined with reference to FIG. 3. A first output of the circulator 43 designed for transmission is connected for example to a magic-T junction 45 that is connected for example to a monopulse type antenna 46. An antenna of this kind comprises for example a sum signal $\Sigma$ and a difference channel $\Delta$. For reception, the sum channel $\Sigma$ is for example connected at input to the first above-mentioned output of the circulator 43 through the magic-T junction 45. The signal received on the sum channel is directed to a second output of the circulator 43 connected to a first input of a first mixer 47, the other output of this mixer being connected to the output of the microwave oscillator through the coupler 44. The signal received at the difference channel $\Delta$ is directed through the magic-T junction 45 to the first input of a second mixer 48, the other input of this mixer being connected to the output of the microwave oscillator 42 through the coupler 44.

The radar transmits and receives for example successively at the four frequencies $F_1$, $F_2$, $F_3$, $F_4$ as illustrated in FIG. 3. The reception is done during the transmission square-wave pulse. The signal received at each frequency is for example demodulated in homodyne fashion by means of the mixers 47, 48 with respect to the oscillator used for transmission at the same frequency. This produces a video signal whose frequency corresponds to the Doppler frequency of the radar target and whose phase is determined by the distance between the radar and the target. Thus, after the modulation, the signal received from a given target is obtained according to the following relationship:

$$x_i(t) = \cos\left(2\pi F dt - \frac{4\pi}{c}F_i D\right) \quad (9)$$

where:

i is the index corresponding to the frequency used Fi where for example i is equal successively to 1, 2, 3 and 4, and Fi is equal to the frequencies $F_1$, $F_2$, $F_3$, $F_4$ defined here above, Fd is the Doppler frequency of the target, D is the distance between the radar and the target, t represents time, c represents the velocity of light.

In the case of an application to an automobile speed regulation radar, where the antenna used is for example a monopulse type antenna, the detection by means of the signal $x_i(t)$ is done by the sum channel $\Sigma$.

This signal $x_i(t)$ is contaminated with an additional noise $b_i(t)$ resulting from the different disturbing phenomena described here above, such as for example the 1/F noise of the transmitter/receiver, the antenna vibrations or the clutter. At output of a mixer 47, 48, the following signal $r_i(t)$ is thus obtained, corresponding to the $i^{th}$ frequency $F_i$:

$$r_i(t)=x_i(t)+b_i(t) \quad (10)$$

According to the invention, the radar processing means amplify and then demultiplex and sample the signals received at the different frequencies so as to form the following difference signals:

$r_1(t)-r_3(t)$ and $r_2(t)-r_4(t)$.

To carry out the above operations, a first amplifier 50 is for example connected to the output of the first mixer 47 intended for the sum channel $\Sigma$. The positive input of a first subtractor element 51, based for example on a differential amplifier is, for example connected to the output of the first amplifier 50 through a switch 52 controlled so as to be closed during the transmission/reception phase at the first frequency $F_1$. The negative input of the first subtractor element 51 is connected to the output of the first amplifier 50 through a switch 53 controlled so as to be closed during the transmission/reception phase at a third frequency $F_3$. The subtractor element 51 takes the difference between its positive input and its negative input. It also for example performs a holding operation on a period of the signals received at the frequency $F_1$ and then at the frequency $F_3$ using for example holding circuits not shown wired between its inputs and the switches, in order to be able to obtain the difference signal $r_1(t)-r_3(t)$. This signal is then, for example, converted digitally by means of an analog/digital converter 54, one input of which is connected to the output of the first subtractor element 51. In analog fashion, a second subtractor element 55 gives the difference signal $r_2(t)-r_4(t)$ to the analog-digital converter 54. To this end, its positive input and its negative input are respectively connected to the output of the first amplifier through a switch 56 controlled so as to be closed during the transmission/reception phase at the second frequency $F_2$ and through a switch 57 controlled so as to be closed during the transmission/reception phase at the fourth frequency $F_4$. The control means for the switches, which are synchronized with those of the microwave oscillator 42, are not shown. The analog/digital converter also has for example the function of sampling the difference signals. To this end it is controlled, for example, by a sampling signal generated by means not shown.

The difference signals $r_1(t)-r_3(t)$ and $r_2(t)-r_4(t)$ are then filtered in a battery of high-resolution Doppler filters especially to separate the targets by their speed, before detection. This battery of Doppler filters is obtained for example by means 49 for performing a fast Fourier transform (FFT). To this end, the analog/digital converter gives digitized data to the fast Fourier transform means 49.

Another approach may consist for example in forming the difference signals $r_1(t)-r_3(t)$ and $r_2(t)-r_4(t)$ at output of the means 49 for computing the fast Fourier transform since this computation is a linear operation. In both cases, the detection of the useful signal is done by the detection of the maximum values and the comparison, with a threshold, of the moduli of the spectral densities of power values formed out of the difference signals.

The moduli of the spectral densities of power values formed from the difference signals $r_1(t)-r_3(t)$ and $r_2(t)-r_4(t)$ are respectively referenced $$|\vec{S}_{r_1-r_3}| \text{ and } |\vec{S}_{r_2-r_4}|,$$

the corresponding spectra at output of computation of the fast Fourier transform FFT being respectively referenced $$\vec{S}_{r_1-r_3} \text{ and } \vec{S}_{r_2-r_4}.$$

The measurement of Vr of the speed of the target detected in the k order filter is given by the following relationship:

$$V_r = \frac{\lambda F_d}{2} = \frac{\lambda}{2} \frac{k}{N} F_e \quad (11)$$

where:
k is the number of the filter in which the detection is done,
$\lambda$ is the wavelength of the radar,
N is the total number of points of the fast Fourier transform FFT,
$F_e$ is the frequency of sampling of the signal,
$F_d$ is the Doppler frequency corresponding to the target.

The measurement of the distance of a detection target in the k order filter is obtained by the computation of the phase difference:

$$\varphi(\vec{S}_{r_1-r_3}) - \varphi(\vec{S}_{r_2-r_4})$$

$$\varphi(\vec{S}_{r_1-r_3})$$

being the phase shift on the spectrum $$\vec{S}_{r_1-r_3} \text{ and } \varphi(\vec{S}_{r_2-r_4})$$

being the phase shift on the spectrum $$\vec{S}_{r_2-r_4}, \vec{S}_{r_1-r_3} \text{ and } \vec{S}_{r_2-r_4}$$

having been defined above. The phase difference $$\varphi(\vec{S}_{r_1-r_3}) - \varphi(\vec{S}_{r_2-r_4})$$

corresponds in fact to the phase difference between the difference signals $r_1(t)-r_3(t)$ and $r_2(t)-r_4(t)$. Any method other than that of using a Fourier transform may be used to determine this phase shift. In fact, according to the invention, the measurement of distance from the target is done on the basis of the phase difference between the two signals constituted respectively by the differences $r_1(t)-r_3(t)$ and $r_2(t)-r_4(t)$ of two signals received $r_1(t)$, $r_3(t)$ and $r_2(t)$, $r_4(t)$ respectively corresponding for example to the first and third transmission frequencies on the one hand and to the second and fourth transmission frequencies on the other hand.

This result may be deduced in successive steps from the above relationship (9). When there is no noise, it becomes:

$$r_1(t) - r_3(t) =$$
$$x_1(t) - x_3(t) = \cos\left(2\pi F dt - \frac{4\pi}{c} F_1 D\right) - \cos\left(2\pi F dt - \frac{4\pi}{c} F_3 D\right) =$$
$$\left[\cos\left(\frac{4\pi F_1}{c} D\right) - \cos\left(\frac{4\pi F_3}{c} D\right)\right] \cos 2\pi F dt +$$
$$\left[\sin\left(\frac{4\pi F_1}{c} D\right) - \sin\left(\frac{4\pi F_3}{c} D\right)\right] \sin 2\pi F dt$$

which is also written:

$$x_1(t) - x_3(t) = -2\sin\left(2\pi F dt - \frac{4\pi}{c} F_0 D\right)\sin\left(\frac{2\pi}{c} \Delta F D\right) \quad (12)$$

in writing $$F_1 = F_0 - \frac{\Delta F}{2} \text{ and } F_3 = F_0 + \frac{\Delta F}{2},$$

$\Delta F$ having been defined above.
We get:

$$\varphi(\vec{S}_{x_1-x_3}) = \frac{2\pi}{c}(F_1 + F_3)D - \frac{\pi}{2} \quad (13)$$

In the same way the following relationship is obtained:

$$\varphi(\vec{S}_{x_2-x_4}) = \frac{2\pi}{c}(F_2 + F_4)D - \frac{\pi}{2} \quad (14)$$

and $$\varphi(\vec{S}_{x_1-x_3}) - \varphi(\vec{S}_{x_2-x_4}) = \frac{4\pi}{c} D \Delta F' \quad (15)$$

$\Delta F'$ having been defined here above.
Giving:
the distance $$D = \frac{c}{4\pi \Delta F'}\left[\varphi(\vec{S}_{x_1-x_3}) - \varphi(\vec{S}_{x_2-x_4})\right] \quad (16)$$

The estimation of difference of the phase:

$$\varphi(\vec{S}_{x_1-x_3}) - \varphi(\vec{S}_{x_2-x_4})$$

may be done in two different ways:

$$\varphi(\vec{S}_{x_1-x_3}) - \varphi(\vec{S}_{x_2-x_4}) = \arctan\left[\frac{\text{Im}(\vec{S}_{x_1-x_3})}{\text{R}(\vec{S}_{x_1-x_3})}\right] - \arctan\left[\frac{\text{Im}(\vec{S}_{x_2-x_4})}{\text{R}(\vec{S}_{x_2-x_4})}\right] \quad (17)$$

Im and R respectively representing the imaginary part and the real part where:

$$\varphi(\vec{S}_{x_1-x_3}) - \varphi(\vec{S}_{x_2-x_4}) = 2\arctan\frac{\left\|\vec{S}_{x_1-x_3} - \vec{S}_{x_2-x_4}\right\|}{\left\|\vec{S}_{x_1-x_3} + \vec{S}_{x_2-x_4}\right\|} \quad (18)$$

In the presence of "noise" in the general sense, this procedure according to the invention to estimate the distance of the target can be used especially to eliminate or greatly attenuate noises of microwave origin, whose spectral density of power is decreasing from the frequency zero onwards and whose fluctuations are slow.

Indeed, these noises appear to be correlated on the reception channels corresponding to the frequencies $F_1$ and $F_3$ on the one hand and $F_2$ and $F_4$ on the other hand, so much so that, by subtraction, these noises are very greatly attenuated. Consequently:

$$r_1(t) - r_3(t) \sim x_1(t) - x_3(t)$$

The difference signal $r_1(t) - r_3(t)$ is therefore substantially equal to the difference signal $x_1(t) - x_3(t)$.

In the same way:

$$r_2(t) - r_4(t) \sim x_2(t) - x_4(t)$$

The difference signal $r_2(t) - r_4(t)$ is therefore substantially equal to the difference signal $x_2(t) - x_4(t)$.

The estimation of phase difference obtained in practice from the difference signals $r_1(t) - r_3(t)$ and $r_2(t) - r_4(t)$ is therefore itself free of noise.

The device according to the invention furthermore enables the attenuation of parasitic phenomena such as rainfall clutter or modulations in the standing wave ratio (SWR) of the antenna related to vibrations which appear at distances close to zero with reference to the radar receiver. Indeed, the difference signals $r_1(t) - r_3(t)$ and $r_2(t) - r_4(t)$ follow a relationship of sensitivity as a function of the distance D which is the following:

$$2\sin\left(\frac{2\pi}{c}\Delta FD\right)$$

whose effect is similar to the effect obtained in a radar with pulse train modulation by a simple cancellation filter attenuating sensitivity at the low Doppler frequency. The extraction of the phase difference and hence of the distance is thereby further improved.

The choice of the differences in frequencies $\Delta F$ and $\Delta F'$ results for example according to the invention especially from the following compromise:

the difference in frequency $\Delta F = F_1 - F_3 = F_2 - F_4$ should for example enable a high attenuation of the signals received in the first meters, without creating holes in the range of the radar and while at the same time providing for maximum sensitivity on the targets within the limits of its range. In the application to automobile radars where the range is for example about 150 m, the difference in frequency may be taken to be equal to about 750 kHz, the difference in frequency $$\Delta F' = \frac{(F_1 + F_3)}{2} - \frac{(F_2 + F_4)}{2}$$

should not generate ambiguities in the measurement of the phase difference $$\varphi(\vec{S}_{x_1-x_3}) - \varphi(\vec{S}_{x_2-x_4});$$

according to the relationship (15), it follows that:

$$\frac{4\pi}{c}D\Delta F'$$

is smaller than $\pi$.

In an automobile application where it is envisaged, for example, that ambiguous measurements of distance beyond 300 m will be rejected, the frequency difference $\Delta F'$ may for example be chosen to be less than 250 kHz. Furthermore, this difference $\Delta F'$ should be as great as possible to adjust the dynamic range of the phase measured to the range of the radar. If the range of the radar is 150 m, the difference in frequency $\Delta F'$ may be chosen for example to be equal to 250 kHz. This leads in particular to a maximum phase equal to $\pi$ for the maximum range.

These values may for example be applied by the means for controlling the modulation of the radar as described by the block diagram of FIG. 4. In this exemplary embodiment of a frequency hopping monopulse radar for automobiles, the detection is done on the sum channel $\Sigma$ of the monopulse receiver by means of the difference signals $\Sigma r_1 - r_3$ corresponding to the frequencies $F_1$ and $F_3$ on the one hand and $\Sigma r_2 - r_4$ corresponding to the frequencies $F_2$ and $F_4$ on the other hand, especially by means of the elements described here above. Since the fast Fourier transform computation means 49 deliver spectra $$\vec{S}_{\Sigma r_1-r_3} \text{ and } \vec{S}_{\Sigma r_2-r_4}$$

and $\Sigma r_2 - r_4$, the distance measurement is done by computing the phase difference:

$$\varphi(\vec{S}_{\Sigma r_1-r_3}) - \varphi(\vec{S}_{\Sigma r_2-r_4})$$

for example according to the relationship (18).

This computation is done for example by a computer (not shown) connected to the output of the fast Fourier computation means 49 or again containing these means.

The angular deviation measurement is obtained for example by computing the relationship between the phase $$\text{shifts:} \quad \frac{|\vec{S}_{\Delta r_1-r_3}|}{|\vec{S}_{\Sigma r_1-r_3}|}$$

where $$|\vec{S}_{\Delta r_1-r_3}| \text{ and } |\vec{S}_{\Sigma r_1-r_3}|$$

represent the spectral densities respectively of the difference signal $\Delta r_1 - r_3$ on the difference channel $\Delta$ and of the difference signal $\Sigma r_1 - r_3$ on the sum channel $\Sigma$ corresponding to the frequencies $F_1$ and $F_3$.

To obtain the difference signal $\Delta r_1 - r_3$ on the difference channel $\Delta$, a third subtractor element 58 is used for example on the difference reception channel $\Delta$. The positive input of this channel is connected to the output of a second amplifier 59 through a switch 60 controlled so as to be closed during the transmission/reception frequency phase corresponding to the first frequency $F_1$. The negative input is connected to this second amplifier 59 through a switch 61 controlled so as to be closed during the transmission/reception phase corresponding to the third frequency $F_3$. The input of the second amplifier 59 is connected for example to the output of the mixer 48 of the difference channel $\Delta$. The third subtractor element 58 gives the difference signal $$\Delta_{r_1-r_3}$$

to the analog/digital converter 54. The digitized signal is then given to the means 49 for computing the fast Fourier transform FFT which delivers the spectrum $$\vec{S}_{\Delta_{r_1-r_3}}.$$

The ratio $$\frac{|\vec{S}_{\Sigma_{r_1-r_3}}|}{|\vec{S}_{\Delta_{r_1-r_3}}|}$$

is for example computed by the above-mentioned computing means and not shown in FIG. 4. Another possible embodiment consists for example in sampling and encoding the signals directly at the output of the amplifiers 50, 59 following the mixers 47, 48. The demultiplexing, instead of being done by the switches 52, 53, 56, 57, 60, 61, is done digitally by a computer, for example the same computer as the one that performs the computation of the fast Fourier transforms and then the computations of distance and angular deviation. A computer of this kind, based on signal processing microprocessors, is well known to those skilled in the art.

The principle of operation according to the invention can be applied to a frequency hopping radar for automobiles designed especially for speed regulation or obstacle detection. It may also be applied to other types of radars, monopulse or otherwise, provided that it possesses a sufficient number of reception channels to obtain the difference signals $r_1(t)-r_3(t)$ and $r_2(t)-r_4(t)$ described here above. The principle of detection according to the invention can also be applied for example to a frequency-ramp continuous wave radar.

A radar according to the invention makes it possible to improve the quality of estimation of the distance obtained by measurement of phase differences, in a continuous wave radar, especially in the presence of a temporarily correlated noise, or more generally in the presence of clutter, or at close distance. Its implementation is simple and does not give rise to any appreciable extra costs as compared with a standard radar.

In a frequency-hopping homodyne automobile radar type of embodiment working in the millimetric wave band, especially at 76 GHz, where the reception is particularly sensitive to low-frequency disturbances, the only physical changes to be implemented relate to the circuit for controlling the microwave oscillator 42 and the analog demultiplexing circuits 52, 53, 56, 57, 60, 61, 51, 55, 58 of the receiver.

Finally, the choices of the differences in the frequencies $\Delta F$ and $\Delta F'$ defined here above enable the adjustment and reduction of the dynamic scale of the receiver as a function of the range that is sought. In the example of the automobile radar having a range of about 150 m, the dynamic scale of the receiver may be reduced by about 15 dB.

What is claimed is:

1. A radar for the detection of a target, comprising:
    means for producing at least four signals wherein each of said at least four signals have separate frequency F1, F2, F3, F4 wherein F1−F3=F2−F4 and; (F1+F3)−(F2+F4)=Cte wherein Cte is a constant frequency value;
    radar means for transmitting to said target and receiving from said target said four signals having said four frequencies;
    calculating means for measuring the distance from said radar to said target wherein said measure distance is a function of two distance signals wherein said first distance signal is determined by the difference between two received signals corresponding respectively to said frequencies F1 and F3 and wherein said second distance signal is determined by the difference between two other received signals corresponding respectively to the frequencies F2 and F4.

2. A radar according to claim 1, wherein a reception signal is demodulated in homodyne mode with respect to the oscillator used for the transmission, at the same frequency.

3. A radar according to claim 1, that is a monopulse radar.

4. A radar according to claim 1, comprising at least:
    one microwave oscillator;
    means to control the modulation of the oscillator at the frequencies $F_1$, $F_2$, $F_3$, $F_4$;
    a reception sum channel ($\Sigma$) comprising means to obtain the first difference signal $$(\Sigma_{r_1-r_3})$$

and the second difference signal $$(\Sigma_{r_2-r_4});$$

a reception difference channel ($\Delta$) comprising means to obtain the first difference signal $$(\Delta_{r_1-r_3})$$

the measurement of distance being obtained by the phase difference between the difference signals $$(\Sigma_{r_1-r_3}, \Sigma_{r_2-r_4})$$

on the sum channel and the measurement of angular deviation being obtained by the ratio between the first difference signal $$(\Sigma_{r_1-r_3})$$

on the sum channel ($\Sigma$) and the first difference signal $$(\Delta_{r_1-r_3})$$

on the difference channel ($\Delta$).

5. A radar according to claim 4, wherein the sum reception channel ($\Sigma$) comprise a first mixer having one input designed for the reception signal and the other input connected to the output of the microwave oscillator and wherein the difference channel (Δ) comprises a second mixer having one input intended for the reception signal and the other input connected to the output of the microwave oscillator.

6. A radar according to claim 5, wherein amplifiers are connected to the output of the mixers.

7. A radar according to any one of the claims 4, 5 or 6, wherein the means for obtaining a difference signal $$(\Sigma_{r_1-r_3}, \Sigma_{r_2-r_4}, \Delta_{r_1-r_3})$$

comprise at least one subtractor element whose positive input is connected to a switch controlled so as to be closed during the transmission/reception phase at the frequency of a first signal ($r_1(t), r_2(t)$) and whose negative input is connected to a switch controlled so as to be closed during the transmission/reception phase at the frequency ($F_3$, $F_4$) corresponding to a second signal ($r_3(t), r_4(t)$), the subtractor element taking the difference between the first signal and the second signal.

8. A radar according to claim 7, wherein the difference signals are sampled and encoded by an analog/digital converter to be given to fast Fourier transform (FFT) computation means, the phase difference being measured on the spectra $$(\vec{S}_{\Sigma_{r1-r3}}, \vec{S}_{\Sigma_{r2-r4}})$$

of the difference signals measured by the Fourier transform.

9. A radar according to claim 4, wherein the signals output from the mixers are sampled and encoded, the difference signals $$(\Sigma_{r_1-r_3}, \Sigma_{r_2-r_4}, \Delta_{r_1-r_3})$$

being defined digitally and then given to fast Fourier transform (FFT) means, the phase difference being measured on the spectra $$(\vec{S}_{\Sigma_{r1-r3}}, \vec{S}_{\Sigma_{r2-r4}})$$

of the difference signals determined by the Fourier transform.

10. A radar according to claim 1, wherein said means for producing said signals having four frequencies includes a frequency ramp applied to a continuous wave.

11. A radar according to claim 1, wherein said signals having said four frequencies are in the 76–77 GHz frequency band.

12. A radar according to claim 1, wherein:
$F_1$–$F_3$ and $F_2$–$F_4$ are substantially equal to 750 kHz, $$\left(\frac{F_1+F_3}{2}\right)-\left(\frac{F_2+F_4}{2}\right)$$

is lower than or equal to 250 kHz.

13. A radar according to claim 1, wherein $F_1$ is substantially equal to 76 GHz.

14. A radar according to claim 1, transmitting successively on the four frequencies $F_1$, $F_2$, $F_3$, $F_4$, the reception taking place during the transmission square-wave pulse.

15. A radar according to claim 1 wherein, in being fitted into an automobile vehicle, it detects the obstacles preceding the vehicle.

* * * * *